(12) United States Patent  
Sun et al.

(10) Patent No.: US 7,414,730 B2  
(45) Date of Patent: Aug. 19, 2008

(54) HIGH PRECISION INTERFEROMETER APPARATUS EMPLOYING A GRATING BEAMSPLITTER

(75) Inventors: Ke-Xun Sun, Stanford, CA (US); Graham S. Allen, Menlo Park, CA (US); Robert L. Byer, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 266 days.

(21) Appl. No.: 11/429,651

(22) Filed: May 5, 2006

(65) Prior Publication Data

US 2006/0290943 A1 Dec. 28, 2006

Related U.S. Application Data

(60) Provisional application No. 60/678,332, filed on May 6, 2005.

(51) Int. Cl.
  *G01B 11/02* (2006.01)
  *G01B 9/02* (2006.01)
  *G01D 5/36* (2006.01)

(52) U.S. Cl. .................. 356/499; 356/521; 250/237 G

(58) Field of Classification Search .............. 356/485, 356/892, 499, 521; 250/237 G
  See application file for complete search history.

(56) References Cited

U.S. PATENT DOCUMENTS

| | | | | |
|---|---|---|---|---|
| 3,822,942 A | * | 7/1974 | Hock | 356/492 |
| 4,689,481 A | * | 8/1987 | Ono | 250/201.5 |
| 5,054,884 A | * | 10/1991 | Kubota | 359/566 |
| 5,646,728 A | | 7/1997 | Coutsomitros | 356/352 |
| 6,315,247 B1 | | 11/2001 | Wehner et al. | 244/158 |
| 6,507,388 B2 | | 1/2003 | Burghoorn | 355/53 |
| 6,583,934 B2 | * | 6/2003 | Kramer | 359/569 |
| 6,710,880 B1 | | 3/2004 | Zhao | 356/482 |
| 6,753,969 B2 | * | 6/2004 | Degertekin et al. | 356/521 |
| 6,956,654 B2 | * | 10/2005 | Osaki et al. | 356/494 |
| 6,982,796 B2 | * | 1/2006 | Sato | 356/521 |
| 2004/0131239 A1 | * | 7/2004 | Shahar | 382/128 |
| 2004/0141678 A1 | * | 7/2004 | Shahar | 385/16 |
| 2004/0141688 A1 | * | 7/2004 | Shahar | 385/37 |
| 2005/0046821 A1 | * | 3/2005 | Hanson et al. | 356/3.01 |
| 2005/0225770 A1 | | 10/2005 | Chapman et al. | 356/498 |
| 2005/0248769 A1 | * | 11/2005 | Weitzel | 356/451 |

OTHER PUBLICATIONS

Sun, Ke-Xun et al. "All-reflective Michelson, Sagnac, and Fabry-Perot interferometers based on grating beam splitters," Optics Letters, vol. 23, No. 8, Apr. 15, 1998.

* cited by examiner

*Primary Examiner*—Patrick J Connolly
(74) *Attorney, Agent, or Firm*—Lumen Patent Firm, Inc.

(57) ABSTRACT

Measurement of a distance change between a reference surface and a target is provided. A substrate has a first surface facing the target and including a grating. The grating and target combine to form an optical interferometer responsive to changes in distance between the grating and the target. A second surface of the substrate coincides with the reference surface and faces away from the target. Thickness information pertaining to the substrate is combined with results from the optical interferometer to provide a measurement of distance change between reference surface and target. The substrate is preferably a rigid material having picometer level dimensional stability.

23 Claims, 4 Drawing Sheets

HIGH PRECISION INTERFEROMETER APPARATUS EMPLOYING A GRATING BEAMSPLITTER

CROSS REFERENCE TO RELATED APPLICATIONS

This application claims the benefit of U.S. provisional application 60/678,332, filed on May 6, 2005, entitled "High Precision Interferometer Apparatus Employing a Grating Beamsplitter", and hereby incorporated by reference in its entirety.

FIELD OF THE INVENTION

This invention relates to optical interferometry for distance metrology.

BACKGROUND

Optical interferometry has been a basic technique of distance metrology for many years. Typically, an optical interferometer having a sensitive optical path including the entire distance to be measured is employed. Variations of this distance on the order of half an optical wavelength will cause the interferometer output to change from constructive interference to destructive interference, or vice versa. Such an interferometer fringe can easily be detected. With advanced measurement techniques, a small fraction of an interferometer fringe can be detected, thereby providing measurement precision on the order of a small fraction of the optical wavelength.

However, this general approach for distance measurement encounters severe difficulties in applications having extremely demanding performance requirements, such as space-based optical interferometry for gravitational wave detection. To appreciate these difficulties, it is helpful to consider a brief description of such a system. A space based interferometer includes several spacecraft, each spacecraft including at least one gravitational proof mass. Detection of gravitational waves is based on detecting corresponding changes in proof mass position. Ideally, the only forces acting on the proof masses are gravitational forces, and a key aspect of the system design is to approach this ideal as closely as possible.

Since the expected effect of gravitational waves on proof mass position is exceedingly small (e.g., the Laser Interferometer Space Antenna (LISA) requires a measurement precision of ~10 pm Hz$^{-1/2}$ from 0.1 mHz to 1 Hz, and the Big Bang Observatory requires a measurement precision of ~1 fm Hz$^{-1/2}$ from 0.1 to 10 Hz), extreme measures are taken to protect the proof mass from external forces. For example, an enclosure around the proof mass can be employed to shield the proof mass from the external force due to the solar wind (or other ambient perturbations). In such situations, the spacecraft is controlled to maintain a certain separation between the enclosure and proof mass, so that the spacecraft is referenced relative to the proof mass (as opposed to the other way around).

In this context, the traditional optical interferometry approach of including the entire distance between the proof masses in a sensitive interferometer path encounters severe difficulties. In particular, such an approach entails passing interferometer light through a window in the enclosure to reach the proof mass. This window is a transmissive optical element in the sensitive interferometer path. Thus, optical path length changes of the window due to the temperature dependence of the refractive index (i.e., dn/dT) are a significant source of measurement error. Thermal expansion of the window is also a relevant source of error, but tends to be less significant than the dn/dT effect. Detailed system analysis including realistic limits on achievable temperature control shows that having transmissive optical elements in a high-precision interferometer is highly undesirable, and can degrade system-level performance.

Another difficulty is that the radiation pressure of the external interferometer light on the proof mass is an undesirable net external force on the proof mass.

Accordingly, it would be an advance in the art to provide interferometric distance measurement that does not require transmissive optical elements in the interferometer to measure the distance to an enclosed object.

SUMMARY

Measurement of a distance change between a reference surface and a target is provided. A substrate has a first surface facing the target and including a grating. The grating and target combine to form an optical interferometer responsive to changes in distance between the grating and the target. A second surface of the substrate coincides with the reference surface and faces away from the target. Thickness information pertaining to the substrate is combined with results from the optical interferometer to provide a measurement of distance change between reference surface and target. The substrate is preferably a rigid material having picometer level dimensional stability.

The invention provides numerous advantages, especially for gravitational wave detection. The invention advantageously avoids the use of transmissive optical elements, which avoids severe errors due to dn/dT effects. Embodiments of the invention can be employed to provide space-based interferometers where the proof masses are not illuminated by external interferometer light (i.e., light coming from another space craft). Instead, the proof masses are illuminated by internal interferometers confined to one spacecraft. This decoupling of internal and external interferometers advantageously allows for independent optimization of each type of interferometer. The point behind angle required between outgoing and incoming beams in the external interferometer can be accommodated in a simple manner by appropriate design of the gratings for the external interferometer.

DETAILED DESCRIPTION

Figure 1:
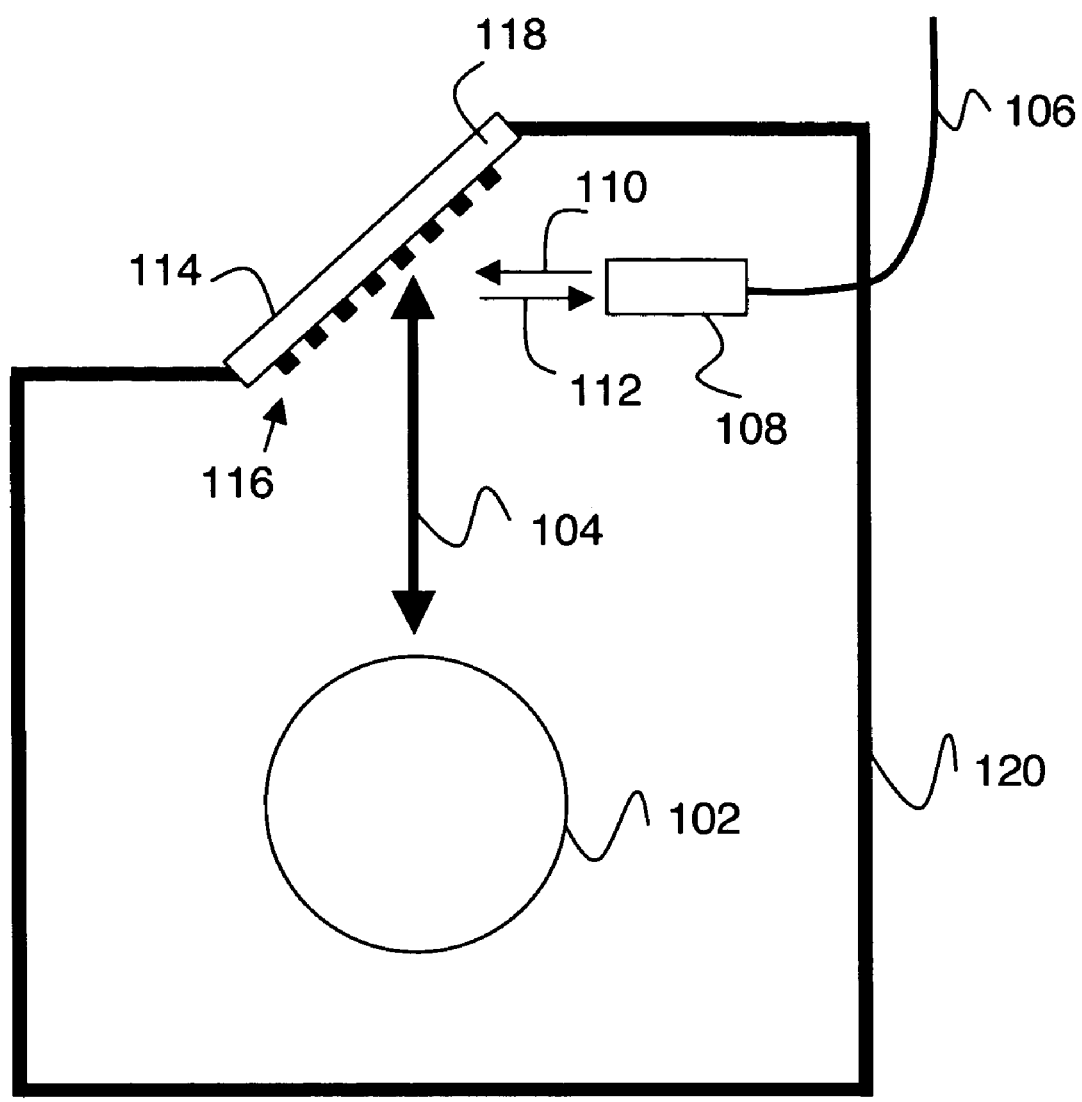
FIG. 1 shows an embodiment of the invention.

FIG. 1 shows an embodiment of the invention. In this embodiment, the distance change between a reference surface 114 and a target 102 is measured. A substrate 118 has a first surface facing target 102 that includes a grating beam splitter 116. A second surface of substrate 118 coincides with reference surface 114. Distance change measurement according to the invention is based on combination of an optical interferometric distance change measurement from target 102 to grating 116 with thickness information relating to substrate 118 to determine the distance between target 102 and reference surface 114. Thus the distance from surface 114 to target 102 is determined by a combination of optical and non-optical methods. A surprising discovery of the present invention is that such a hybrid method can provide significantly improved measurement precision compared to other approaches (e.g., optical interferometry through a window, or non-optical approaches such as capacitive distance sensing).

FIG. 1 shows a preferred interferometer configuration, where grating 116 and target 102 form a Fabry-Perot interferometer (i.e., grating 116 is in a Littrow configuration with respect to target 102). The sensitive optical path of this interferometer is shown as 104 on FIG. 1. Light can be coupled to and from this interferometer in any convenient manner. FIG. 1 shows a preferred configuration where an optical fiber 106 in combination with collimating optics 108 (e.g., a graded-index (GRIN) lens) provide input radiation 110 to the interferometer and receive output radiation 112 from the interferometer. Importantly, the interferometer signal is responsive to changes along sensitive path 104, and is not responsive to changes or perturbations in fiber 106 or between collimating optics 18 and grating 116. Thus, for example, phase noise in fiber 106 does not degrade the interferometer signal.

The interferometer configuration shown in FIG. 1 is preferred for simplicity, since a minimal number of optical components is required. In particular, grating 116 acts as a beam splitter and beam recombiner, and is a reflective component. Thus this interferometer includes no transmissive optical elements in sensitive optical path 104, which is preferred for reasons given above. However, the invention can be practiced with any kind of optical interferometer suitable for measuring length changes of path 104. Suitable interferometers include, but are not limited to, Fabry-Perot interferometers, Michelson interferometers, Sagnac interferometers, and Mach-Zehnder interferometers. Although the example of FIG. 1 shows the grating being tilted with respect to the interferometer axis, it is also possible for the interferometer axis to be at normal incidence with respect to the grating.

The interferometer formed by target 102 and grating 116 is responsive to distance changes along sensitive optical path 104. In particular, the interferometer is responsive to changes in the distance between the first surface of substrate 118 and target 102. In order to obtain the distance change from target 102 to reference surface 114, thickness information relating to substrate 118 is employed. Preferably, substrate 118 is fabricated from a rigid material having picometer level dimensional stability. Suitable materials include, but are not limited to, silicon, fused silica, sapphire, and glasses having low thermal expansion coefficient ($C_{TE}$) such as Zerodur® and Cervit®. Substrate material preferences can depend on additional requirements placed on the substrate. For example, silicon is preferred in cases where mechanical stability and high thermal conductivity are desired, and low $C_{TE}$ glasses or fused silica are preferred in cases where minimal $C_{TE}$ is desired.

Thickness information can take many forms. It is not typically required to know the absolute thickness of substrate 118 to high precision. Instead, it suffices to ensure that changes in this thickness are negligible and/or can be accounted for. Thus relative (as opposed to absolute) thickness information usually suffices. For example, a 2 mm thick substrate having a typical thermal expansion coefficient of $0.4 \times 10^{-6}$ 1/K has about a 1 pm thickness change for a 1 mK temperature change. Temperature changes on the order of 1 mK can be measured accurately, and the resulting relative thickness information can be used to accurately reference the distance change measurement to reference surface 114 (e.g., with an appropriate calibration procedure).

In sharp contrast, use of transmissive interferometer optics can lead to a much more severe temperature dependence. For example, a recent estimate of this sensitivity gave a 40 pm path length change for a 1 µK temperature change. This sensitivity is larger than the sensitivity in the above example by a factor of 40,000, vividly illustrating the advantages provided by all-reflective optical interferometry in accordance with principles of the invention for high-precision measurements. Although such dn/dT effects can be countered (at least in principle) by tight temperature control and/or use of temperature measurements to calibrate the distance changes, accurate sub-micro Kelvin thermal control and/or calibration presents formidable practical difficulties.

The embodiment of FIG. 1 also includes an enclosure 120 around target 102. Substrate 118 is included in a wall of the enclosure such that the first surface of the substrate is included in the interior surface of the enclosure and the second surface of the substrate (i.e., reference surface 114) is included in the external surface of the housing. As indicated above, measuring distance changes from an external reference surface to an enclosed target presents special difficulties (e.g., dn/dT in a transmissive window). These difficulties are addressed by embodiments of the invention.

Although the desirability of measuring distance changes from an external reference surface to a target is apparent in space-based gravitational wave interferometers, the invention is broadly applicable to any situation where a distance change measurement needs to be referred to an external reference surface facing away from the target. For example, distance change measurements from an external reference to an object inside an environmental control chamber are useful in various applications, such as semiconductor processing. For example, the target can be a semiconductor wafer and the environmental chamber can be a vacuum chamber. Conventional approaches for environmental chamber applications (e.g., as in US 2005/0225770) employ a window in the chamber wall which is included in the sensitive optical path of the interferometer. As indicated above, having a window in the interferometer path is undesirable.

A noteworthy feature of the embodiment of FIG. 1 is minimal inclusion of optical elements within enclosure 120. In particular, it is not necessary for active optical elements (such as sources) to be present within enclosure 120, and only passive elements such as fiber, a grating and a lens are needed. For gravitational wave detection, such simplicity is advantageous for reducing environmental disturbances imparted to target 102 (i.e., the proof mass). For environmental chamber applications, such simplicity is advantageous for providing compatibility with chamber conditions. For example, operation of an optical source can be degraded if the source must be located in a chamber at an elevated temperature.

As indicated above, a key application of the invention is to gravitational wave detection. For this application, target 102 is a gravitational proof mass, and housing 120 is part of a spacecraft. The gravitational proof mass is preferably spherical, in order to simplify proof mass and spacecraft control by reducing the number of proof mass degrees of freedom. Sufficient interferometer fringe visibility can be obtained by reflection from a spherical proof mass having a diameter from 2-10 cm in an interferometer having a grating to proof mass separation on the order of 1-2 cm. Thus there is no need to provide a flat face or facet (or a focusing surface) on the proof mass to act as an interferometer mirror. The relatively large separation of 1-2 cm between enclosure and proof mass is a significant advantage of the invention compared to conventional capacitive detection of proof mass position in an enclosure (which requires a much smaller enclosure to proof mass separation). Increasing the separation between the proof mass and the enclosure desirably reduces the coupling of environmental perturbations (e.g., spacecraft noise) to the proof mass. Patterns can be provided on the proof mass surface (e.g., lithographically) to provide information on motion and orientation of the proof mass.

Figure 2:
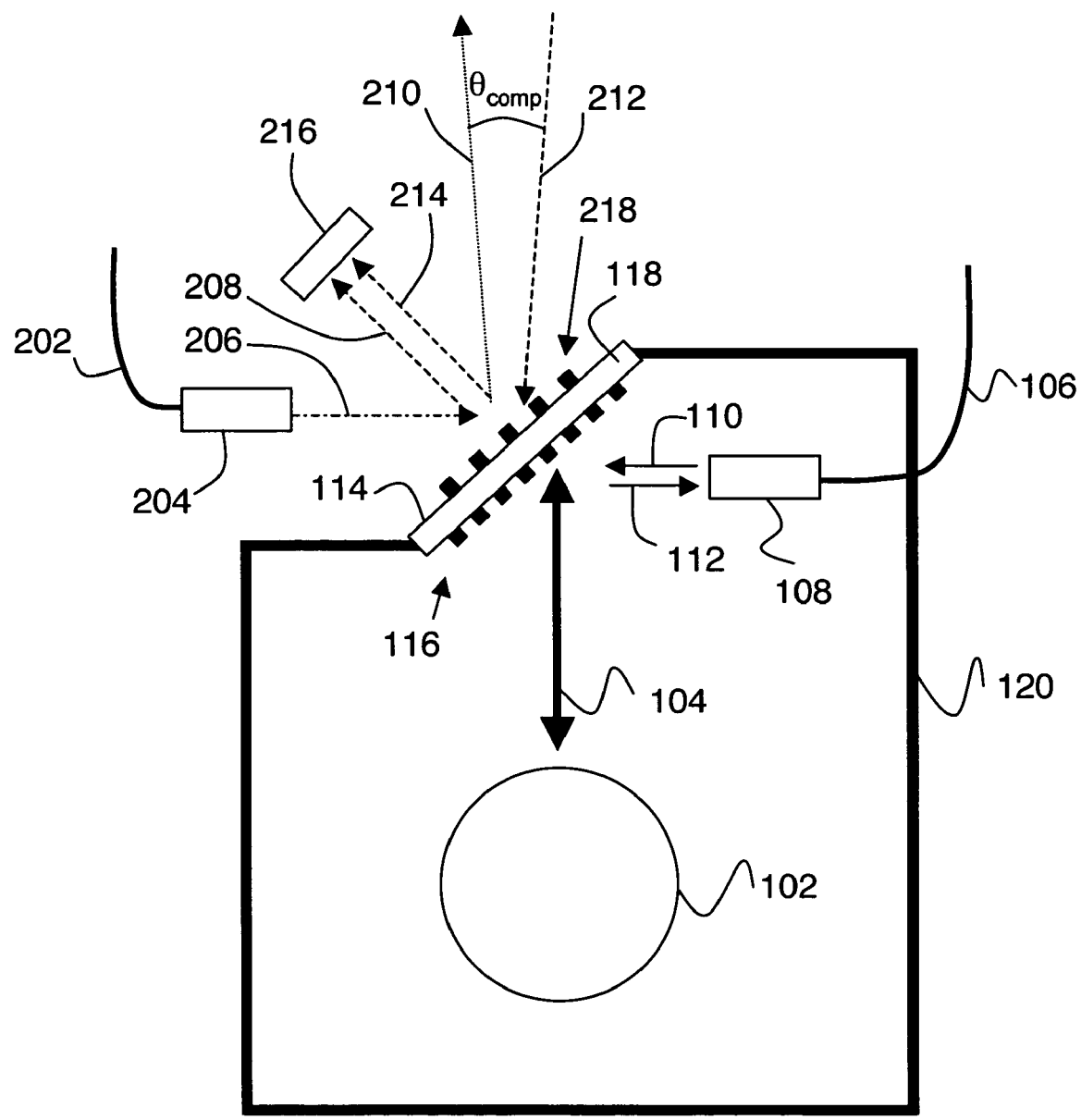
FIG. 2 shows an embodiment of the invention having an internal interferometer and an external interferometer.

FIG. 2 shows an embodiment of the invention having an internal interferometer and an external interferometer. This embodiment is a preferred embodiment in connection with gravitational wave detection. In this embodiment, a second diffraction grating 218 is disposed on reference surface 114. Grating 218 forms an external interferometer extending to a target on a remote spacecraft (not shown). Grating 218 acts as beam splitter and recombiner, which is a preferred interferometer configuration since transmissive optical elements in the sensitive interferometer are avoided. The external interferometer can be of any type, and can be illuminated in any manner. The specific example of FIG. 2 shows a heterodyne detection scheme and a point-ahead correction provided by grating 218, as preferred features.

More specifically, an optical fiber 202 connected to collimating optics 204 (e.g., a GRIN lens) provides input radiation beam 206 to grating 218. Grating 218 is designed to be polarization selective, such that part of input radiation 206 having one polarization is directed as radiation beam 208 to detector 216, and the orthogonally polarized part of beam 206 is directed as radiation beam 210 to the remote spacecraft. Beams 208 and 210 correspond to diffraction into two different orders. Preferably, the polarization of beam 206 is set such that most of the power in beam 206 ends up in beam 210, and a small fraction ends up in beam 208. Light from the remote spacecraft is received as beam 212, orthogonally polarized to beam 210. Beam 212 is diffracted by grating 218 as beam 214 which is also received by detector 216.

The configuration at the remote spacecraft is also as shown in FIG. 2. Thus beam 212 on FIG. 2 is provided by diffraction of light from a source on the remote spacecraft by a grating disposed on the reference surface of the remote spacecraft. The optical sources on the two spacecraft are phase-locked lasers having a well-defined RF frequency offset. Methods of providing such phase-locking between two lasers are known in the art. Due to the phase-locking of the two sources, the phase of the RF heterodyne signal from detector 216 is responsive to the physical separation between reference surface 114 and the remote spacecraft reference surface. Thus an external interferometer responsive to the separation between the reference surfaces of two separate spacecraft is provided. In practice, a control loop may be employed to force the phase of the RF signal from detector 216 to be constant by frequency controlling the local optical source. In such cases, a loop control signal responsive to the separation between reference surfaces can be used as the external interferometer signal. Doppler shift of received optical frequencies due to relative spacecraft motion can be accounted for without altering the general nature of the above-described measurement. Since techniques for heterodyne interferometry are well known in the art, no further description of these techniques will be provided here.

Beams 210 and 212 are shown separated by an angle $\theta_{comp}$ on FIG. 2. This point-behind angle is needed to compensate for the relative motion of the two spacecraft relative to each other during the optical time of flight between spacecraft. An important advantage of the invention is the ability to provide a simple correction for point behind angle by appropriate design of grating 218. More specifically, the grating pitch d to provide such compensation is given by $$d = \frac{\lambda}{\sin(\theta_{out} + \theta_{comp}/2)\cos(\theta_{comp}/2)}, \quad (1)$$

where $\theta_{out}$ is the angle between beams 208 and 210 on FIG. 2. The simplicity of this approach is highly advantageous compared to conventional approaches where external radiation impinges on the proof mass, thereby requiring changes in proof mass control (which can compromise performance) to accommodate the point behind angle.

In the embodiment of FIG. 2, the end to end distance change measurement for proof masses on two separate spacecraft is broken up into three segments. Segment one is the internal interferometer on spacecraft A, referencing proof mass A to an outward facing reference surface "$A_{ref}$" on spacecraft A (e.g., as described in connection with FIG. 1). Similarly, segment two is the internal interferometer on spacecraft B, referencing proof mass B to an outward facing reference surface "$B_{ref}$" on spacecraft B. Segment three is the external interferometer between spacecraft A and B, responsive to distance changes between $A_{ref}$ and $B_{ref}$. As described above, the heterodyne external interferometer of the embodiment of FIG. 2 is directly responsive to the separation between $A_{ref}$ and $B_{ref}$. A key insight of the invention is that greater precision in length change measurement can be provided by this "layered" approach than by a conventional optical interferometer reaching from end to end in a single optical path.

A further advantage of this embodiment of the invention is that the internal and external interferometers are completely separate. In particular, they can be separately optimized for their respective purposes. For example, the external interferometer can operate at a short wavelength and at high optical power to improve received signal strength from a remote spacecraft. Since space based interferometers can operate over very large distances (e.g., a spacecraft separation of 5,000,000 km is proposed for one system), such flexibility is helpful for system design. Furthermore, external interferometer light is not incident on the gravitational proof masses, thereby avoiding potential issues due to radiation pressure on the proof masses.

Figure 3:
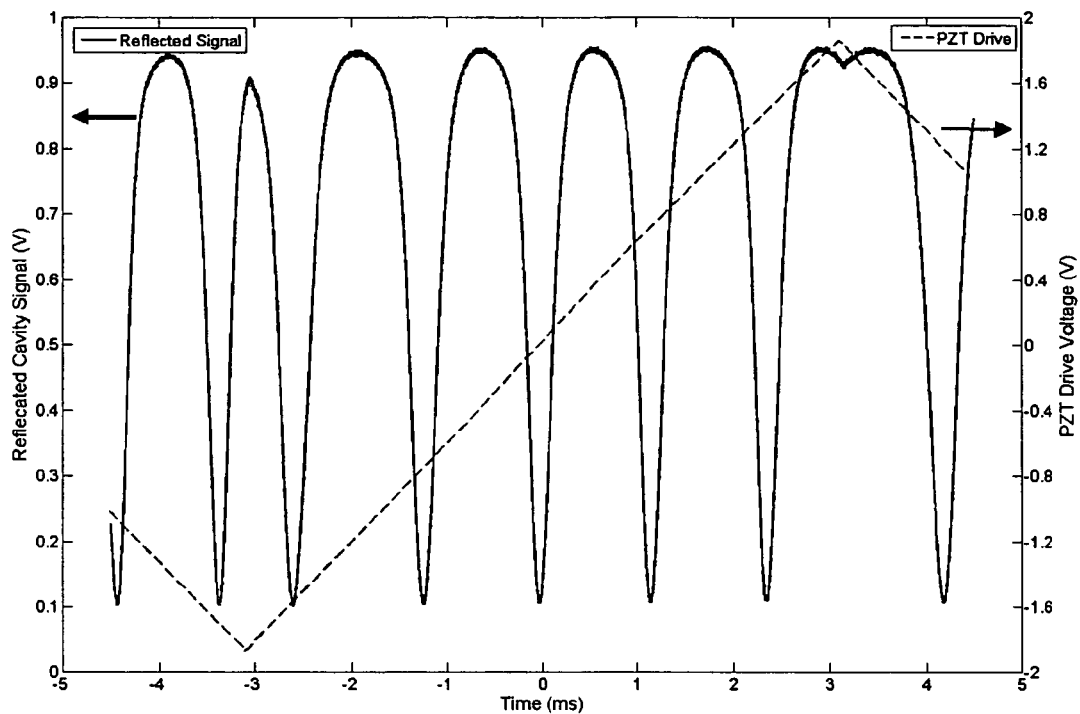
FIG. 3 shows measured results from an experiment relating to an embodiment of the invention.

FIG. 3 shows measured results from an experiment relating to an embodiment of the invention. In this proof of concept experiment, the optical configuration was essentially as shown in FIG. 1. A Littrow grating Fabry-Perot cavity having a length of 1.5 cm was employed. The optical source was a fiber-coupled wavelength stabilized laser diode providing 1.0 mW at 1534 nm. A GRIN lens was placed about 5 mm from the grating and had an output beam waist of about 0.5 mm. A flat mirror having a PZT driver was employed as the target. The grating has a line density of 830 lines/mm, giving a Littrow angle of 39.5°. FIG. 3 shows the interferometer reflected signal as the target is scanned with the PZT. In this preliminary experiment, the readout sensitivity is about 10-30 pm $Hz^{-1/2}$, which is a significant improvement relative to capacitive sensing having a sensitivity of about 1000 pm $Hz^{-1/2}$. The optical back action on the target is estimated as about $6.67 \times 10^{-12}$ N. For comparison, the back action force of a capacitive sensor having 1 $cm^2$ electrodes, a 2 mm gap and a 1 V potential difference is $2.8 \times 10^{-11}$ N, which is about 3× larger than the optical force. Further reduction in the effect of radiation pressure can be obtained by symmetric illumination of the proof mass.

Figure 4:
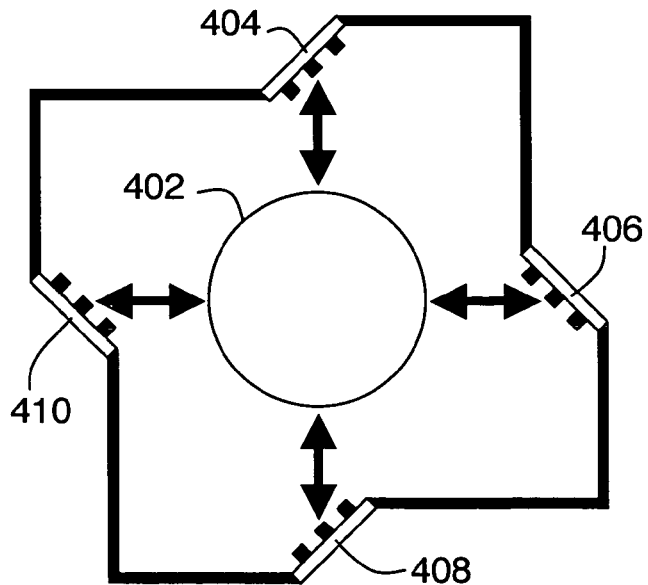
FIG. 4 shows an embodiment of the invention having symmetric illumination of the target to reduce the net effect of radiation pressure on the target.

FIG. 4 shows an embodiment of the invention having symmetric illumination of the target to reduce the net effect of radiation pressure on the target. In this example, four substrates 404, 406, 408, and 410 are symmetrically disposed around a target 402. By setting roughly equal optical power levels in each corresponding optical interferometer, the net radiation force on target 402 can be largely canceled out. Although any arrangement of internal interferometers can be employed to practice the invention, preferred arrangements are symmetrically disposed around the proof mass in a 3-D pattern. Such arrangements can be employed to directly measure thermal expansion of the proof mass and/or housing, and to directly measure the proof mass geometric center. Furthermore, increased measurement sensitivity can be obtained by combining readings from multiple interferometers. In such arrangements having multiple internal interferometers, the wavelengths of operation of the interferometers can be made distinct, which can reduce undesirable interference or crosstalk from one internal interferometer to another internal interferometer.

Figure 5:
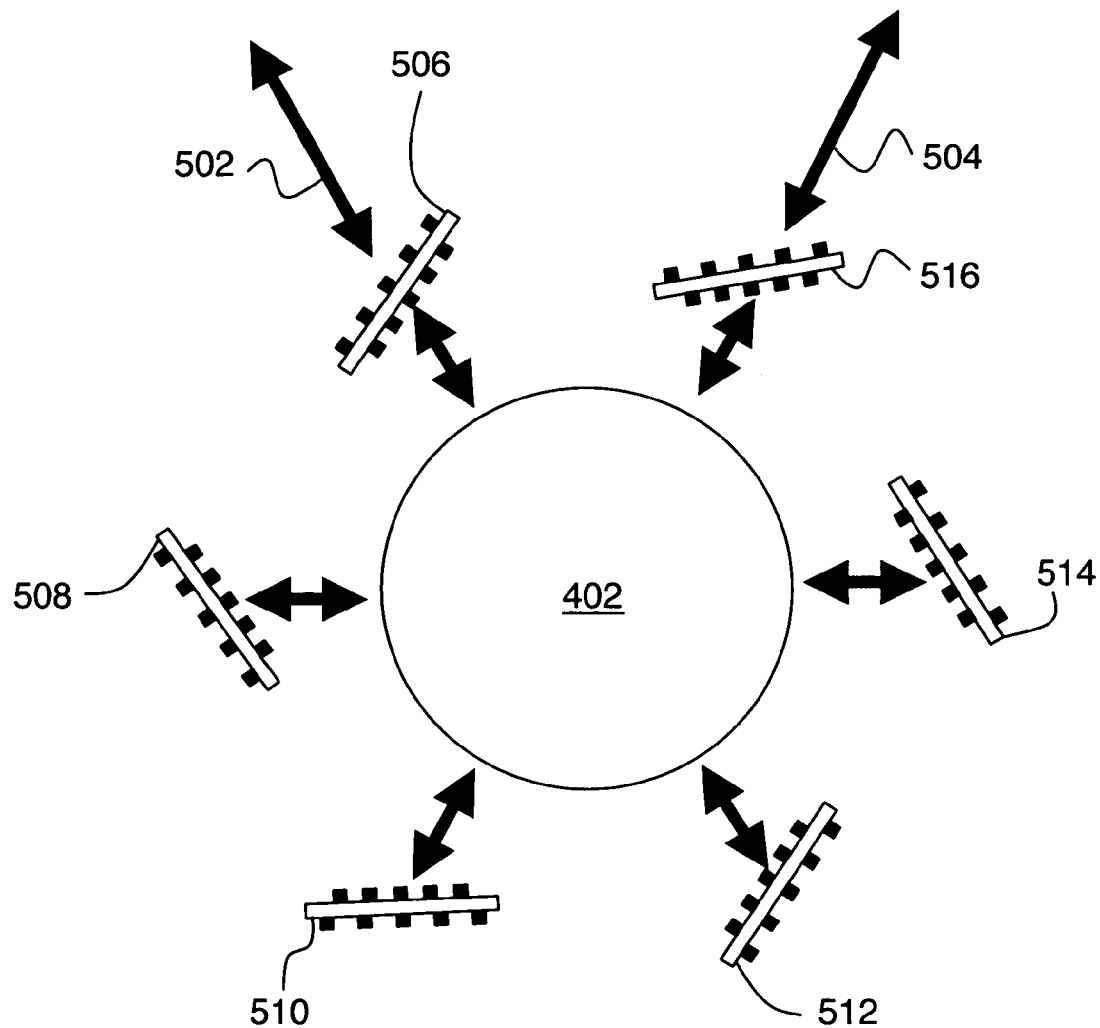
FIG. 5 shows an embodiment of the invention having symmetric illumination of the target in combination with two or more external interferometers.

FIG. 5 shows another embodiment of the invention having a symmetric arrangement of internal interferometers. In this example, substrates 506, 508, 510, 512, 514, and 516 are symmetrically disposed about proof mass 402. External interferometers 502 and 504 are also shown, for measuring separations to two remote spacecraft. Such flexibility is important, since space based interferometers are often arranged as constellations of three or more spacecraft. The invention can be practiced in embodiments having any arrangement of external interferometers in any spacecraft constellation, and having any number of external interferometers per spacecraft.

Although the preceding description has concentrated primarily on application of the invention to gravitational wave detection, the invention provides improved distance metrology. As such, the invention is broadly applicable to any situation where a distance change measurement is useful. Applications include, but are not limited to: gravitational wave metrology, spacecraft control, semiconductor processing metrology, and biological metrology.

The invention claimed is:

1. Apparatus for measuring a distance change between a reference surface and a target, the apparatus comprising:
    a substrate having a first surface facing the target and having a second surface coincident with the reference surface;
    a first grating beam splitter at the first surface, wherein the first grating beam splitter and target form an optical interferometer responsive to changes in a distance between the target and the first surface; and
    a processor for combining results from the interferometer with thickness information relating to the substrate to provide the distance change between the reference surface and the target.

2. The apparatus of claim 1, wherein said substrate comprises a rigid material having picometer level dimensional stability.

3. The apparatus of claim 2, wherein said rigid material comprises a material selected from the group consisting of silicon, fused silica, sapphire, and low $C_{TE}$ glasses.

4. The apparatus of claim 1, wherein said optical interferometer comprises a Littrow grating Fabry-Perot interferometer.

5. The apparatus of claim 1, wherein input radiation to said optical interferometer is provided from an optical fiber and wherein output radiation from said interferometer is received by the optical fiber.

6. The apparatus of claim 1, wherein said optical interferometer is a reflective optical interferometer having a sensitive optical path that includes no transmissive optical element.

7. The apparatus of claim 1, further comprising an enclosure around said target, wherein said substrate is included in a wall of the enclosure, wherein an interior surface of the enclosure includes said first surface and wherein an exterior surface of the enclosure includes said second surface.

8. The apparatus of claim 7, wherein said target comprises a semiconductor wafer and wherein said enclosure is a vacuum enclosure.

9. The apparatus of claim 7, wherein said target comprises a gravitational proof mass and wherein said enclosure is part of a first spacecraft.

10. The apparatus of claim 9, wherein said proof mass is substantially spherical.

11. The apparatus of claim 9, wherein said proof mass includes lithographically defined marks on its surface.

12. The apparatus of claim 9, further comprising a second grating at said second surface.

13. The apparatus of claim 12, wherein said second grating comprises part of an external interferometer for measuring a distance from said first spacecraft to a second spacecraft.

14. The apparatus of claim 13, wherein said second grating provides a pointing angle correction to account for motion of said second spacecraft relative to said first spacecraft during an optical time of flight between said first spacecraft and said second spacecraft.

15. The apparatus of claim 13, wherein said second grating provides a polarization-dependent splitting of an incident optical beam into two or more diffracted beams.

16. The apparatus of claim 13, wherein light from said external interferometer is not incident on said gravitational proof mass.

17. The apparatus of claim 9, wherein said enclosure further comprises:
    one or more additional substrates included in said wall of said enclosure, wherein said interior surface of said enclosure includes a first surface of each additional substrate, wherein said exterior surface of said enclosure includes a second surface of each additional substrate, and wherein each of the second surfaces of the additional substrates coincides with a corresponding additional reference surface;
    an additional grating beam splitter at each of the first surfaces of the additional substrates, wherein each additional grating beam splitter forms a corresponding additional optical interferometer responsive to changes in a distance between said target and the corresponding first surface;
    wherein said processor is capable of combining results from each of the additional optical interferometers with corresponding substrate thickness information to provide distance changes between the additional reference surfaces and the target.

18. The apparatus of claim 17, wherein said substrate and said additional substrates together form a set of substrates which are disposed substantially symmetrically with respect to said gravitational proof mass.

19. The apparatus of claim 17, wherein said substrate and said additional substrates together form a set of substrates which are disposed in a three dimensional pattern with respect to said gravitational proof mass.

20. The apparatus of claim 17, wherein said optical interferometer and said additional optical interferometers together form a set of interferometers which have two or more wavelengths of operation, whereby cross talk between members of the set of interferometers can be reduced.

21. A method of measuring a distance change between a reference surface and a target, the method comprising:

providing a substrate having a first surface facing the target and having a second surface coincident with the reference surface;

providing a grating beam splitter at the first surface, wherein the grating beam splitter and target form an optical interferometer responsive to changes in a distance between the target and the first surface; and combining results from the interferometer with thickness information relating to the substrate to provide the distance change between the reference surface and the target.

22. The method of claim 21, further comprising providing a temperature dependent substrate thickness correction to said thickness information depending on substrate temperature.

23. The method of claim 21, wherein said distance is measured in connection with an application selected from the group consisting of: gravitational wave metrology, spacecraft control, semiconductor processing metrology, and biological metrology.

* * * * *